J. W. JEPSON.
DYNAMO ELECTRIC MACHINE.
APPLICATION FILED MAY 8, 1913.
1,262,587.
Patented Apr. 9, 1918.
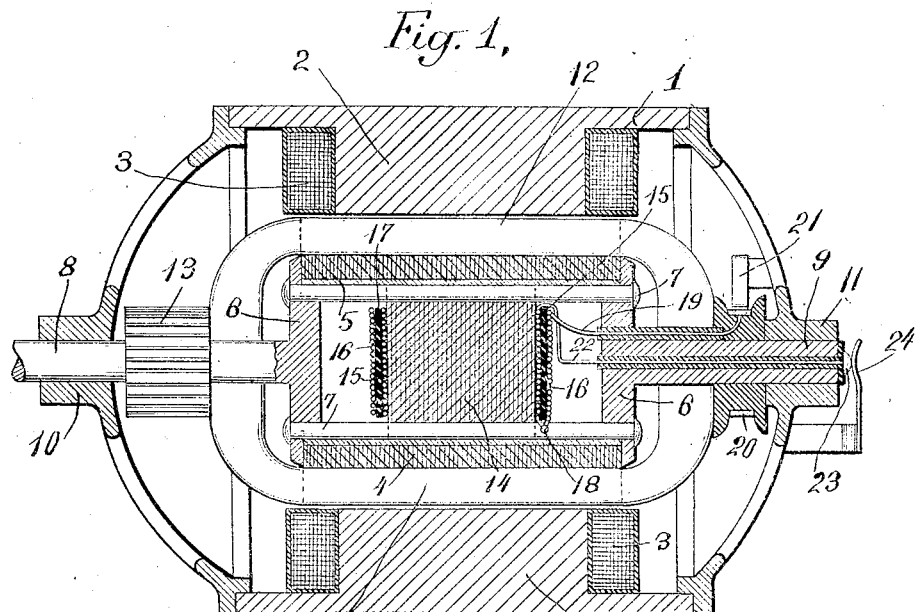
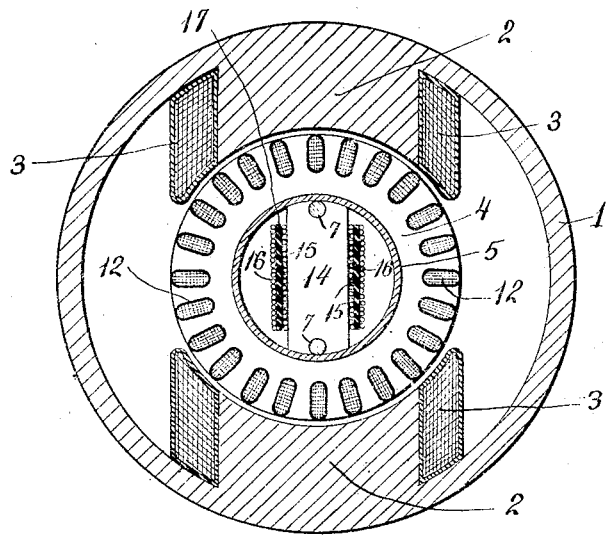
WITNESSES
INVENTOR
John W. Jepson
BY
Kenyon & Kenyon
ATTORNEYS

UNITED STATES PATENT OFFICE.

JOHN W. JEPSON, OF DEPEW, NEW YORK, ASSIGNOR TO GOULD COUPLER COMPANY, A CORPORATION OF NEW YORK.

DYNAMO-ELECTRIC MACHINE.

1,262,587.   Specification of Letters Patent.   Patented Apr. 9, 1918.

Application filed May 8, 1913. Serial No. 766,257.

*To all whom it may concern:*

Be it known that I, JOHN W. JEPSON, a citizen of the United States, and a resident of Depew, Erie county, New York, have invented certain new and useful Improvements in Dynamo-Electric Machines, of which the following is a specification.

My invention relates to improvements in dynamo electric machines, and more particularly to a machine adapted to supply direct current for charging storage batteries and supplying lights on motor vehicles driven by gas engines, and at the same time supplying high tension alternating current for the ignition of the engine.

One object of the invention is to provide a simple machine for accomplishing the above, which is not only compact and efficient in service but is also easily and cheaply constructed. Further objects, features and advantages will more clearly appear from the detail description, taken in connection with the accompanying drawings, in which—

Figure 1 is a longitudinal section through a machine embodying the improvements in one form, and Fig. 2 is a transverse section thereof.

Referring to the drawings, 1 represents a frame carrying the fixed field magnets 2 with the windings 3 thereon. 4 represents the laminations of a cylindrical drum-wound armature structure held in place by cylindrical core 5, end plates 6 and bolts 7. Projecting from the plates 6 are shafts 8 and 9 rotating in bearings 10 and 11 respectively, carried by the frame 1. The drum-wound armature is provided with distributed windings 12 connected to a commutator 13 on the shaft 8 so that the drum-wound armature is adapted to deliver or receive direct current.

Held in place by bolts 7 are laminations 14 forming the magnetic structure of a shuttle-wound high tension magneto armature having a shuttle winding thereon comprising two coils 15 and 16 separated by insulating means 17. The two coils are connected together and grounded to the metal of the machine at 18.

The coils 15 and 16 are in transformer relation to one another, the coil 15 being a high resistance winding adapted to be connected to and furnish high tension current to the ignition of the gas engine through lead 19, slip ring 20 and brush 21, while the coil 16 is a low resistance winding and is connected to the timer of the engine through lead 22, button 23 and brush 24. Since the operation of high tension magnetos in connection with gas engines is well understood in the art it will be unnecessary to further describe the operation of the machine, except to point out that the direct current drum armature and the high tension shuttle magneto armature, which is disposed within the drum armature, are both affected by and in operative relation to the same field magnets 2, although only part of the flux which passes through the drum armature passes through the shuttle armature. However, that portion of the flux which does pass through the shuttle armature is amply sufficient to generate the necessary high tension alternating current for efficient sparking.

By the arrangement described not only are two machines combined in one in a most simple, cheap and efficient manner, thereby eliminating or doing away with many parts, but at the same time all the advantages of the well known high tension magneto are retained without in any way decreasing the efficiency of the direct current end of the machine.

Although I have described my improvements in detail and with respect to one particular form thereof, nevertheless I do not desire to be limited to such details except as clearly specified in the appended claims, and many changes and modifications may well be made without departing from the spirit and scope of my invention in its broader aspects.

Having fully and clearly described my improvements, what I claim and desire to secure by Letters Patent, is:

1. A dynamo electric machine of the class described, having field magnets, an armature structure with an armature winding and commutator thereon for delivering or receiving direct current, and a shuttle-wound winding on said armature for delivering high tension alternating current for ignition purposes, said shuttle winding comprising a primary coil and a secondary coil in transformer relation thereto, said armature windings being independent and affected by the magnetic field produced by the field magnets.

2. A dynamo electric machine of the class described, having stationary field magnets, a drum-wound direct current armature structure with an armature winding and commutator thereon for delivering or receiving direct current, and a shuttle-wound winding on said armature for delivering high tension alternating current for ignition purposes, said shuttle winding comprising a primary coil and a secondary coil in transformer relation thereto and disposed within the direct current armature, said armature windings being independent and affected by the magnetic field produced by the field magnets.

In testimony whereof, I have signed my name to this specification, in the presence of two subscribing witnesses.

JOHN W. JEPSON.

Witnesses:
C. FITZGERALD,
P. W. ENGLISH.